April 11, 1961  G. W. LEWIS  2,978,990
FLUID PUMPS
Filed May 3, 1956  2 Sheets-Sheet 1
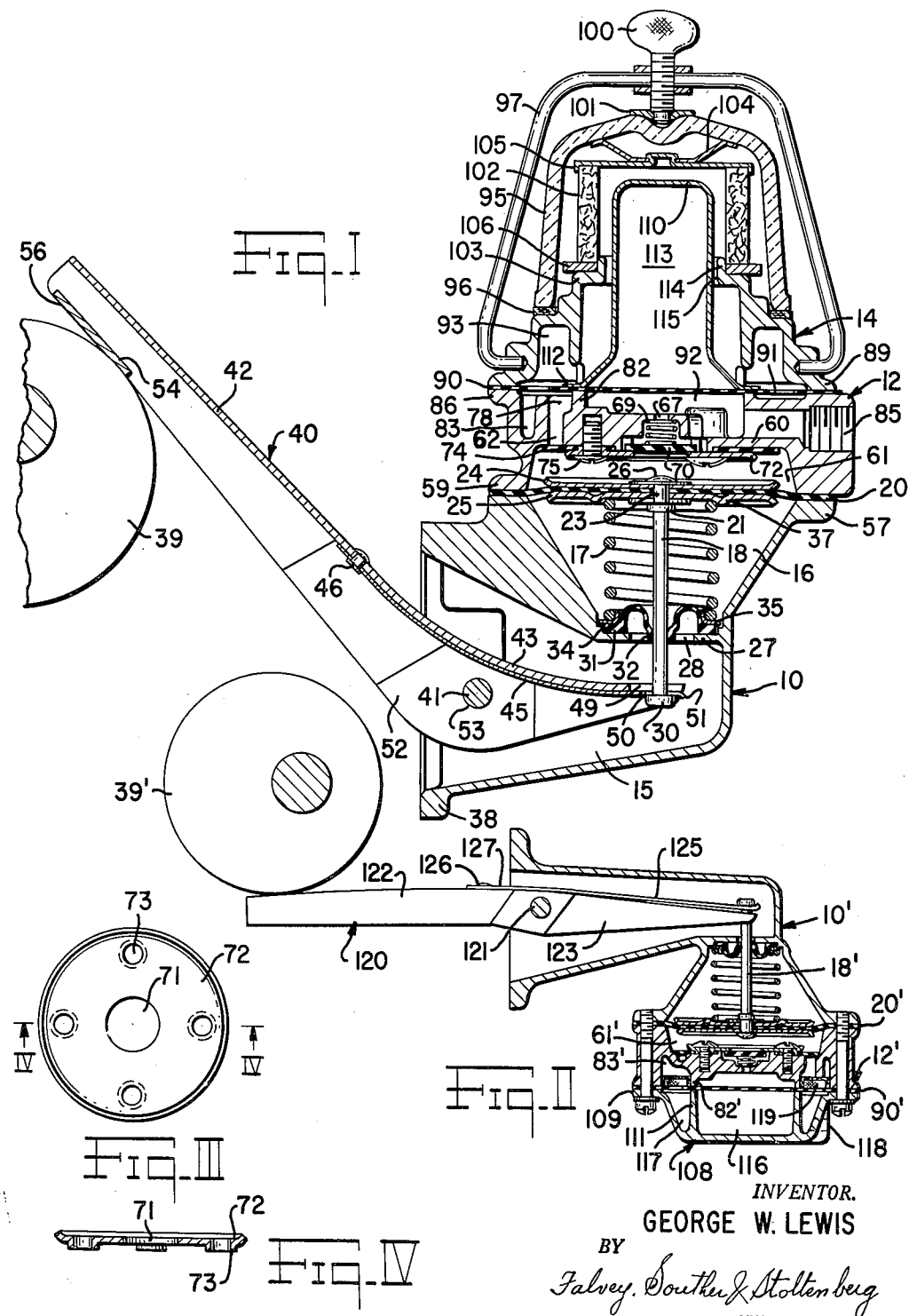
INVENTOR.
GEORGE W. LEWIS
BY
Falvey, Souther & Stoltenberg
ATTORNEYS

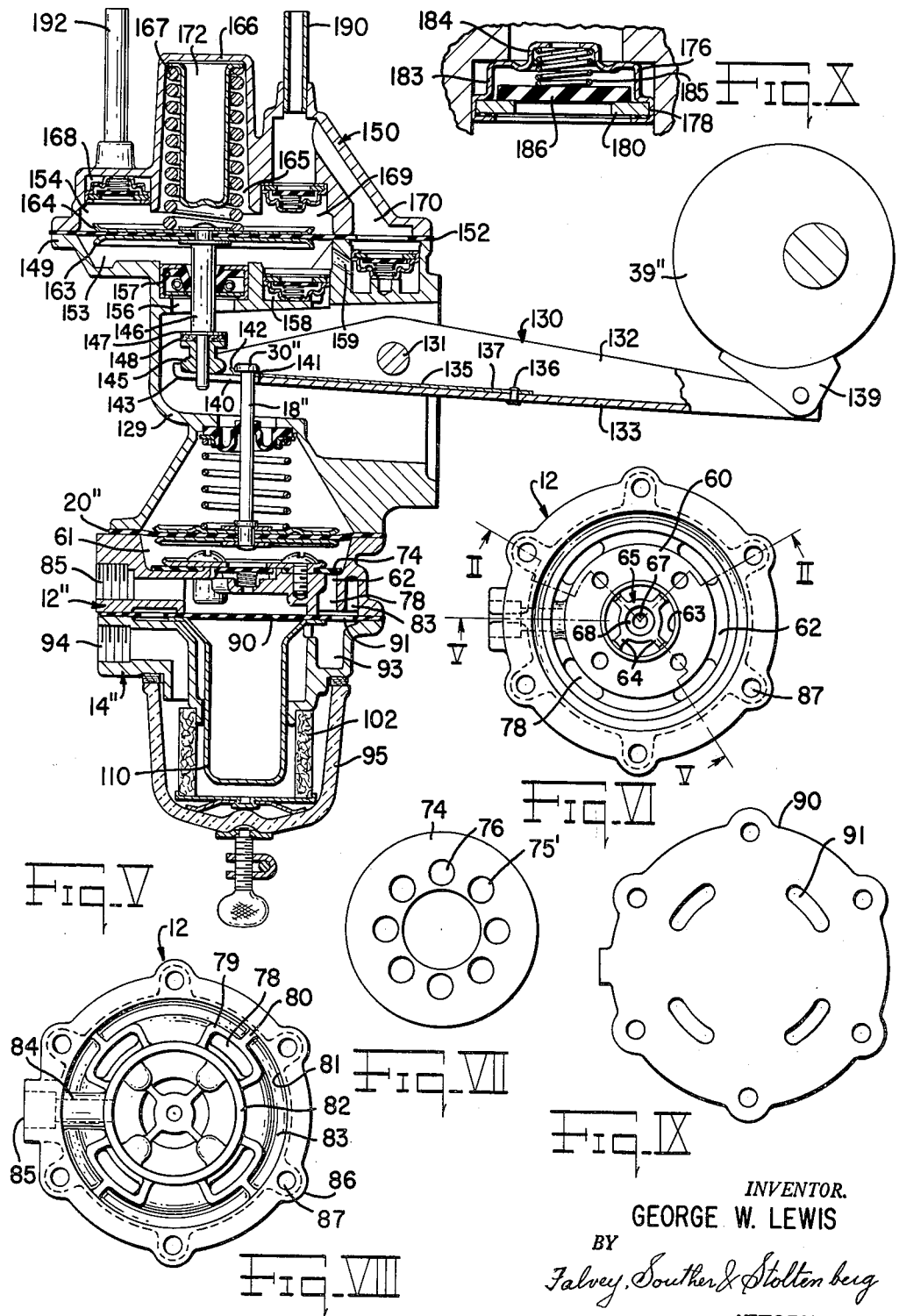

United States Patent Office 2,978,990
Patented Apr. 11, 1961

2,978,990

FLUID PUMPS

George W. Lewis, 2411 Evergreen Road, Toledo, Ohio

Filed May 3, 1956, Ser. No. 582,403

5 Claims. (Cl. 103—150)

This invention relates to fluid pumps, particularly of the diaphragm type which are used for the transfer of fluids in fuel systems and vacuum supply systems for automobiles.

The invention comprehends a pumping mechanism providing a relatively large capacity for a given physical size having great simplicity in its structure and very quiet and reliable in its operation, wherein the valve means are arranged as a unitary sub-assembly highly adaptable for mass production manufacture, usable as a component for different types of pumps.

The invention comprises a new and improved fuel pump capable of transferring and handling volatile fuels for engines which is simple in construction, noiseless in operation, and economical to manufacture, including readily connected components whereby the inlet and outlet openings are capable of being assembled in different directions to accommodate various engine installations.

The invention embraces a pumping mechanism which is quickly primed and is capable of supplying an ample delivery of fuel to the carburetor bowl at low speeds, particularly during engine cranking.

This invention includes a novel pulsator construction or air domes for improving the overall efficiency of a diaphragm pump, rendering the same capable of a very effective fluid transfer at exceedingly high speeds.

According to the foregoing summary of the invention, indicating its nature and substance, one of the main purposes is the provision of a fluid pump in which large pumping capacity for a given size is obtained by utilizing novel pulsator chambers or air damping chambers in combination with an inherently resilient annular valve mechanism cooperating with a central spring-pressed valve for the transfer of fluid to and from the pumping chamber.

In the operation of pumps of this character, various inertia forces are encountered, both in starting the diaphragm from rest or after back pressure in the pumping chamber has subsided. As the result of such conditions, the diaphragm must be started from rest and instantaneously brought to a speed to that of its operating mechanism. These inertia forces are considerable and frequently cause injury to the various surfaces periodically brought into engagement, especially after continuous operation, producing objectionable noises and impairing the effective life of the pump, particularly the diaphragm. In accordance with the present invention, such inertia forces are damp and the objectionable noises overcome as the actuating mechanism for the pump provides a constant yielding and guiding connection between the operating cam and the reciprocating or oscillating diaphragm. This yielding connection is, in part, secured by the provision of a composite yielding arm as a component of the lever proper whereby sufficient pressure is exerted to hold one end of the lever in direct engagement with the operating cam while the other end is in constant engagement with the handling member of the diaphragm placing the latter under tension throughout its operating range and allowing changes in its position caused by the presence of fluid in the pumping chamber.

One object of the invention is the provision of a lever actuating mechanism coacting with novel pulsator or air damping chambers to provide a smooth transfer of the fuel without subjecting the diaphragm to undue stresses.

It is another object of the invention to provide a fuel pump or a combination fuel and vacuum pump which is capable of universal application by including components that may be arranged to suit very different types of engine installation producing a resulting assembly which does not require special skill and special fittings to install.

Another object of the present invention, which enhances the universality of the pump is the provision as a unitary sub-assembly comprising the stationary section of the pumping chamber as well as the inlet and outlet valve means and outlet connector, which sub-assembly may constitute a component of widely different types of fuel pumps as well as combined fuel and vacuum pumps for automobiles.

Another object of the invention is the provision of the secondary annularly apertured diaphragm acting as a sealing gasket between portions of the housing and concurrently serving as a wall for pulsator chambers.

Another object of the invention resides in the provision of resilient valve elements for controlling the flow of fuel to the pump which are highly reliable and efficient in operation and readily accessible for quick repair and replacement whereby the pumping mechanism may be reconditioned without a great amount of time and expenditure, so that the engine or vehicle is out of service for a negligible period of time.

Another object of the invention is the provision of a combination fuel and vacuum pump which is very efficient in operation, either in its upright or inverted position, without requiring material changes or complex adjustments, and which permits changes in the angular relation of the inlet and outlet openings to fit different engine installations, permitting the pumping mechanism to be used as a replacement for a variety of pumps and in original installations wherein the pump can be connected to pipes meeting the housing at various angles.

A further object of the invention resides in the arrangement of an inlet valving mechanism located adjacent to the housing walls comprising a plurality of annularly disposed ports and wherein the outlet valving is a centrally positioned aperture provided with a resilient valve whereby boiling of the fuel is practically avoided and the capability of the pump to handle fuel vapor is materially enhanced.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a sectional elevation of a pump embodying the invention;

Fig. II is a sectional elevation showing another form of pump embodying the invention;

Fig. III is a top plan view of the outlet valve seat and inlet valve retainer which is a component of each of the embodiments of the invention shown in Figs. I, II, and V;

Fig. IV is a sectional view taken on lines 4—4 of Fig. III;

Fig. V is a sectional elevation of a combined fuel and vacuum booster pump embodying the invention;

Fig. VI is a top plan view of the valve housing member being a component of each of the embodiments of the invention shown in Figs. I, II, and V, in which the detachable components of the outlet and inlet valves are removed;

Fig. VII is a top plan view of the flexible disc member constituting the inlet valve;

Fig. VIII is a bottom plan view of the valve housing member shown in Fig. VI;

Fig. IX is a top plan view of the annularly apertured secondary flexible diaphragm; and Fig. X is an enlarged sectional view of the check valve assembly for the air or vacuum pump.

In the drawings, for purpose of typical illustrations, the features of the invention are shown as embodied in diaphragm pumps for the transfer of fuel, as well as in a combined fuel and vacuum booster unit. However, it should be clearly understood that the principles and features of the invention are believed to be applicable to other types of reciprocable pumps, and that the invention, therefore, should not be limited to the particular forms shown because it is contemplated to use the same whenever the invention may be found to be of utility.

It can be seen by perusal of the drawings that in the different embodiments of the invention illustrated, the supporting and housing structure, for the component elements of the pump, is formed by three superimposed separable members or transverse sections provided with mating flanges, joined together clamping in spaced relation a main and a secondary annularly apertured diaphragm. These sections may be broadly termed; the mechanism supporting housing; the valve and outlet connector housing; and the inlet connector housing. The main diaphragm is interposed and marginally clamped between the mechanism supporting housing and one side the valve housing, forming therewith the pumping chamber, while the secondary diaphragm is interposed and marginally clamped between the other side of the valve housing and the end section of the inlet connector housing, providing thereby an annular fuel inlet chamber, a central outlet fuel discharging cell, and inlet and outlet air domes and pulsator.

The valve housing is arranged to be placed in different positions with respect to the mechanism supporting housing, and, in turn, the valve housing and the inlet connector housing are arranged for independent movement with respect to each other, so that the inlet and outlet side connectors can be arranged in different angular relationships whereby the resulting pump assembly can be readily attached to different engine piping installations. In addition, the three sections are designed to be used either in upright or inverted positions, this being particularly applicable to the valve housing which is intended as a universal component of different types of fuel pumps, as well as of different types of combined fuel pump and vacuum booster units.

Referring particularly to Fig. I of the drawings, a fuel pump is illustrated comprising a composite housing formed by transversely disposed members or sections in axial alignment constituting the mechanism supporting housing 10, the valve and outlet connector housing section 12, and the inlet connector housing section 14, preferably made by die casting.

The lower section or mechanism supporting housing 10 comprises a laterally directed hollow portion 15 connected to a vertically disposed conical hollow section 16 which encloses the resilient means for conditionally effecting the motion of the pumping element or piston means of the pump, such as the driving spring 17 and pull rod 18, which is directly connected or attached to the central portion of the piston means such as the diaphragm 20 in leak-proof relation. In the form shown, the pull rod or handling member of the diaphragm is illustrated as a headed slidable stem formed at its upper end with the stepped portion providing a shoulder 21, from which it projects the end section 23, which is adapted to snugly pass through aligned openings provided in oppositely disposed shallow, cupped discs or reinforcing plates 24 and 25, as well as the diaphragm 20, and by spinning the end, as at 26, acts to clamp the diaphragm between the reenforcing plates providing thereby a fluid-tight connection.

The transverse wall 27, which acts as a partition of the housing section 10, is pierced by an aperture 28, through which extend the enlarged head 30 of the pull rod 18. The aperture 28 is sealed by a flexible sealing member 31, having a central nipple 32, which sealingly fits the shank of the pull rod 18 and from which depends a skirt portion terminating in a peripheral flange 34 arranged to span the aperture 28 to effectively prevent oil seepage and the ingress of foreign matter into the chamber 16 without interfering with the freedom of movement of the pull rod 18. The peripheral flange 34 of the sealing member 31 is urged in tight engagement with the transverse wall 27 by the spring 17 through the retainer 35. The coil spring 17, which performs the dual function of holding the sealing member 31 in position, as well as conditionally producing the discharge stroke of the pump, is held in concentric relation with the shank of the pull rod 18 by means of concentric corrugations 37 provided in the diaphragm reenforcing plate 25.

The hollow portion 15 of the housing section 10 located below the transverse wall 27 is provided at its open end with a peripheral flange 38, by means of which the pump is adapted to be detachably connected to a suitable source of power for actuating the mechanism which reciprocates the diaphragm or pumping element. In the form of the invention shown in Fig. I, an eccentric or cam member 39 rotated by a shaft, which may be one of the main rotating elements of a power source or engine, illustrates a continually reciprocating or rotating member having a suitable uniform throw which constitutes the power driven part used to impart oscillatory motion to the pull rod 18 for actuating the pumping element or diaphragm 20.

An important feature of the invention deals particularly with a motion and torque-transmitting mechanism interposed as an elastic coupling between the power driving part, such as the cam 39, and the pull rod 18 attached to the reciprocable but pressure-responsive pumping element 20. The power-transmitting mechanism, providing automatic take-up and noise-suppressing means, is inclusive of lever means fulcrumed or pivoted on a stationary part, such as the lateral walls of the housing section 10. The lever means extends on each side of its pivotal axis forming a rigid outer arm adapted to forcibly engage and be operated by the power operated cam 39 and a composite inner arm structure which includes a rigid section and a yielding acting part vertically spaced therefrom and aligned for engagement therewith. The yielding acting part is in constant engagement with the pull rod, whereby the lever means provides a constant connection with the pumping element for the transmission of motion and force which connection is substantially rigid under certain conditions of operation and provides a decrease in rigidity under other operating conditions particularly when pressure is present in the pumping chamber.

In the embodiment of the invention shown in Fig. I, the power-transmitting mechanism comprises a lever 40 pivoted adjacent one of its ends on suitable means, such as by the pin 41, carried by the lateral walls of the casing section 10. The lever 40, preferably made of sheet steel, of channel-shaped cross section, comprises an outer arm 42 having a uniplanar longitudinal surface located rearwardly of its pivotal axis arranged for contacting engagement with the continually-operated cam 39 and an inner composite bifurcated section. This section is formed by a rigid curved section 43, which is shown as an integral part of the lever, and a yielding acting part, which may take the form of a thin plate inherently elastic, such as a flat spring 45, one end of which is fixed to the arm 42 of the lever rearwardly its pivotal axis. The leaf spring 45 has one of its ends riveted as at 46 to the bottom surface of the lever section 42 and, in its non-operative position, forms a continuation of the said uniplanar section 42 of the lever. In this form of the invention, the rigid inner section 43 is curved and arranged to provide a predetermined angular relationship with the longitudinal axis of the lever, so that the leaf spring 45 is inherently biased to serve as an elastic supplementary finger of the actuating lever 40. As a result of this angular relationship, the spring 45 is in constant engagement with the enlarged head 30 of the pull rod 18, even at times when pressure is present within the pumping chamber which pushes the diaphragm downwardly placing the pull rod 18 out of engagement with lever section 43 so as to render rotation of the cam 39 temporarily ineffective to impart full reciprocatory movement to the diaphragm. The curvature of the inner section 43 of the lever provides a suitable configuration to produce mutual contacting engagement in an asymptotic line between members 43 and 45 whereby a rolling point contact occurs when the normally uniplanar leaf spring 45 is progressively forced into full engagement with the curved section 43, whereby during the pumping cycle the effectiveness of the leaf spring 45 as a yielding acting part is gradually decreased producing a substantially rigid unit for the transmission of force to pull the diaphragm 20 against the action of spring 17.

As shown in Fig. I, the inner arm of the lever 40, which constitutes a composite bifurcated structure formed by the divergent arms 43 and 45 of substantially the same length and in vertical alignment, is formed with forked end sections 49 and 50 which are arranged to straddle the shank of the pull rod 18. The yielding acting arm or leaf spring 45 is constructed and arranged so that its forked section 50 is in constant engagement with the underside of the enlarged head 30 of the pull rod 18 snugly straddling its shank and has its extreme end abruptly bent, as at 51, so that the furcations are also in direct engagement with the lateral section or side walls of the head 30 nesting the same, and thereby providing not only a constant pull on the diaphragm but also constantly guiding the pull rod 18 whenever movement is imparted thereto.

The lever 40 as well as the rigid component of the composite structure, which has been designated as 43, formed by an integral part thereof, is preferably fabricated from sheet steel and is formed so that its back and side walls are substantially at right angles with the back having a substantially uniform width throughout its length. The side depending walls are struck out forming an enlarged section 52 adjacent to its pivotal axis and are provided with aligned apertures 53 to accommodate the pivot pin 41 and the remainder gradually decreasing in height from the enlarged section 52 toward their respective extremities. The outer extremity of the arm 42 is provided with a contacting shoe 54 formed with a suitable surface preferably a curved or arcuate face 56 for engagement with the cam or continuously rotating part 39.

The vertically directed conical hollow portion 16 of the lower housing section 10 is formed at its open end with a horizontally disposed peripheral flange 57, preferably provided with equally spaced threaded openings adapted to receive threaded bolts (not shown) passing through suitable openings 87 provided in the mating flange 59 of the valve housing 12 for fastening the housing sections 10 and 12 together, clamping the diaphragm 20 therebetween.

The valve and outlet connector housing 12 is of tubular or barrel-like shape with a transverse division wall 60 located about its median portion forming, by its relationship with the diaphragm 20, the stationary part of the pumping chamber 61, as well as a component of the concentrically disposed inlet and outlet valves. The under side of the wall 60, is formed with a uniplanar surface having an annular groove 62 near its periphery and is centrally bored forming a cavity 63 spanned by a plurality of arms 64 centrally joined, establishing a central section 65 with four unobstructed passages for the fluid discharged from the pumping chamber 61. The section 65 is pierced by a central orifice 67 and has a circular recess 68, adapted to accommodate and seat the biasing spring 69 which lightly urges the outlet valve 70 to closed position against a seat formed by the surface adjacent to the centrally disposed opening 71 provided in the inlet valve retainer 72. The outlet valve member 70 may take the form of a flexible disc, preferably made of rubber-like or other suitable material capable of resisting volatile fuels, such as gasoline.

The inlet valve retainer and outlet valve seat 72, see Figs. III and IV, is formed with flanged openings 73 which serve as clamping control in order that the annular inlet valve member 74 is held in position without undue distortion when clamped against the wall 60 through the retainer 72 by the screws 75. The flexible valve member 74, preferably made of rubber-like material, is formed with spaced apertures 75' adapted to receive with ample clearance the flanges of the openings 73 (see Fig. VII), and is also provided with intermediate openings 76 in order to prevent interference with the effective seating of its outer section to seal the groove 62 from communication with the pump chamber 61. The wall 60 is formed with a plurality of oblong openings 78 leading to the groove 62, each being surrounded by skirt portions 79, which in turn are connected on one side by partitions 80 to the inner surface 81 of the tubular housing, and have their other side merging into a projecting cylindrical wall 82 providing, with the skirt portions 79, four separate cells or compartments 83 having restricted communication as it is contemplated that end of the skirts and partitions will not engage the secondary diaphragm.

The top side of the dividing wall 60 of the valve housing 12, as shown in Fig. VIII, has a radial rib pierced forming a passageway 84 extending from wall 82 to the threaded opening on the housing outer wall to provide the outlet side connector 85 for the delivery of fluid discharged by the centrally located outlet valve. The housing section 12 is also provided with an outwardly extending flange 86 formed with openings 87 for receiving bolts passing through corresponding openings in the mating flange 89 of the housing section 14 for securing these sections together, clamping therebetween the secondary flexible diaphragm 90 by its marginal section. The diaphragm 90 (see Fig. IX) is preferably made of rubber-like or other flexible material resistant to volatile fluids, such as gasoline, and has four oblong apertures 91 arranged for registration with the skirted oblong apertures 78 forming thereby passageways leading to the inlet check valve. The imperforate surface of the diaphragm serves as a flexible wall spanning the opened end of the compartments 83 and also engages the end of the circular projecting wall 82 forming a distendable cell 92 for receiving fuel discharged from the pumping chamber before its delivery by the outlet side connector 85.

The housing section 14 is formed at its under side with an annular pocket 93, defined by concentric tubular side walls which are interrupted by a hollow radial rib which provides the inlet side connector 94. To the outer stepped surface of the pocket 93, there is removably secured an inverted cup 95 which may be of glass and which is held in leak-proof relation through a gasket 96 by a bail 97. The top of the bail is provided with a screw 100 provided with a disc 101, the latter engaging the top of the cup 95 to hold the same in position. Within the cup 95 is located a tubular fuel filter 102 which is urged against a shoulder 103 of another stepped portion of the housing section by a flat spring 104 carried by a circular plate 105 closing its top end and reacting against cup 95 for urging the same in sealed position through a gasket 106.

An important feature of the invention is the provision of a closed distendable outlet air dome located in axial alignment with the outlet valve. In the form shown in Fig. I, this outlet air dome, for ease of manufacture, is formed by an elongated, cup-shaped sheet metal member 110 having a flared section terminating into an outwardly disposed, planar flange 112 which is clamped with the secondary diaphragm between the end of the wall 82 and that of the inner tubular wall of the pocket 93 providing thereby a closed distendable outlet air dome 113. The member 110 is held in position in axial alignment with the distendable cell 92 and the centrally positioned outlet valve of the pumping chamber by engaging spaced protruding fingers 114 formed on the inner wall 115 of the housing 14.

The operation of the form of the invention hereinbefore described is such that whenever the cam 39 is rotated, a rocking motion is imparted to the pivoted lever 40 whereby the arm 43 of the lever is moved or cycled clockwise and counter-clockwise to effect the reciprocatory movement of the diaphragm 20 through the yielding acting member 45 constantly connected to the pull rod 18. With the parts in the position shown in Fig. I, and assuming that the rigid portion 43 of the lever 40 is moved clockwise by the rotation of the cam 39, motion will be imparted through the yielding acting member 45 to flex the diaphragm downwardly and produce the intake stroke of the pumping mechanism. During the intake stroke, when there is no back pressure in the pumping chamber 61, the rigid arm 43 will be in contact through its full length with the leaf spring 45 on account of the opposition offered to such movement by the spring 17. Thus, the inner bifurcated section of the lever 40 is substantially unyielding, so that its working stroke corresponds to the full travel of the arm 43 whereby the diaphragm will be positively moved downwardly compressing the spring 17 and the storing energy therein during the full length of its travel in a clockwise direction. This will distend the pumping chamber 61 and will transfer fuel contained in a reservoir or tank, not shown, by way of the inlet side connector 94 to the pumping chamber 61.

The fuel drawn to the inlet connector 94, by the increase in the volume of the pumping chamber 61, which is produced during the intake stroke of the diaphragm, is delivered by its right angle passage, best shown in Fig. V, into the glass cup 95 which provides a sediment collector chamber. The fuel in the cup 95 is drawn past the filter 102 into the annular pocket 93 which is closed by the secondary diaphragm and is directed through its apertures 91 in registration with the skirted openings 78 to the annular groove 62 flexing the periphery of the check valve 74 into the pumping chamber 61, whereby the fuel enters the chamber at its periphery filling the same.

Further rotation of the cam 39 will change the movement of the bifurcated sections 43—45 from clockwise to counter-clockwise direction, whereby the energy stored in the spring 17 will be released to push the diaphragm upwardly as the bifurcated section of the lever is moving in the same direction. The upper movement of the diaphragm 20, conditionally produced by the spring 17, decreases the volume of the pumping chamber 61 bringing about the discharge or expulsion stroke of the pump. The upward movement of the diaphragm will move the intake check valve member 74 to closed position by urging its periphery into engagement with the planar section of the dividing wall 60 adjacent the groove 62 and concurrently will unseat the outlet check valve 70 to permit the discharge of fuel from the pumping chamber into the distendable cell 92 and thereafter the delivery of fuel through the outlet side connector 85 to the fuel consuming device fed by the pump, such as a carburetor, not shown.

When fuel is not demanded by the carburetor, or consumed by any other device with which the pump is being used, fuel will remain in the pumping chamber 61, building pressure therein. The presence of pressure within the pumping chamber 61 pushes down the diaphragm compressing the spring 17 moving downwardly its pull rod 18 whereby the constantly pulling leaf spring 45 moves relative to the rigid section 43 of the lever 40. This relative movement decreases the length of engagement and produces a change in the spacing or longiangular relationship of the leaf spring 45 with respect to the rigid arm 43 whereby the rigid member 43 has a sliding non-working motion with respect to the pull rod 18.

It should be observed that the length of the working stroke of the lever 40 decreases as the length of the contacting engagement of leaf spring 45 with the rigid arm 43 decreases in the same ratio, and that the length of their engagement is dependent upon the amount of pressure built up within the pumping chamber and is a function thereof. Notwithstanding the fact that the rigid arm 43 has a non-working motion when pressure occurs within the pumping chamber, this invention obviates objectionable noise and provides an intermittent shock or slap-preventing means as the load imposed on the lever means in further compressing the spring 17 is gradually taken up by increasing the length of engagement of the arm 43 with the leaf spring 45.

The increase in the length of the contacting engagement of the rigid lever section 43 with the cantilever spring 45 occurs gradually as the load imposed by the resilient member 17 is taken up by the actuating lever because this increase is the result of forcing together into rolling point contact the spring and lever sections from divergent positions into a full length engagement condition to produce a substantially rigid lever arm for positively transmitting the required force to fully distend diaphragm 20. Thus, the resiliency, and, therefore, the length of the cantilever of the spring 45 decreases as the force transmitted increases to effect the transmission of force in a substantially rigid condition as it is contemplated that the rigid portion 43 of the lever has the same effective length of the spring 45 when their full length engagement akes place.

It should be noted that in the form of the invention shown in Fig. I, by the cooperative relationship of the three housing sections, ample air domes or air damping chambers are provided to cushion the flow of the fluid through the pumping mechanism which includes the top portion of the annular pocket 93. In addition, it should be observed that the annular intake valve member 74 is at all times supplied or covered by fuel which is maintained in the compartments 83 and in the groove 62 before its discharge into the pumping chamber 61.

In the form shown in Fig. II, a modified pump is illustrated inverted from the position of the prior embodiment herein described. In this form of the invention, the pump is also formed by superimposing three separable transverse sections provided with mating flanges, joined together clamping in spaced relation a main and a secondary annularly apertured diaphragm. The mechanism supporting housing 10' and the valve outlet connector housing section 12', as well as the pumping diaphragm 20' and secondary diaphragm 90' are substantially identical with the corresponding parts in the previous form of the invention and will not be described in detail.

In the modified form of the invention, the motion and torque transmitting mechanism forming the elastic coupling between the power driven part, such as the cam 39' and the pull rod 18' attached to the reciprocable but pressure-responsive pumping element 20' is inclusive of a lever, fulcrum, or pivoted on the stationary housing section 10'. The lever 120 is preferably made of sheet steel of channel-shaped cross-section formed with a uniplanar top surface extended at each side of its pivotal axis 121 forming a rigid outer arm 122 adapted to contact the continually operated cam 39' and a composite inner arm structure including the rigid section 123 and a yielding acting part 125 which may take the form of a thin plate inherently elastic affixed to the top surface of the outer arm at a point located rearwardly of its pivotal axis. The yielding acting part 125 of the lever 120 is shown in the form of a leaf spring 125 having one of its ends riveted as at 126 to the top surface of the lever arm 122 at a point rearwardly of the pivotal axis 121. In order to secure the proper bias relationship and preferably produce mutual contacting engagement in an asymptotic line between the members forming the bifurcated section of the lever, the leaf spring 125 is formed adjacent to its pivotal point with a flat section 127 and the remainder of the body portion is curved whereby not only the angular relationship is accomplished, but a rolling contacting engagement is provided between the leaf spring 125 and the uniplanar top surface of the lever 120.

The inlet connector section 108 of the form shown in Fig. II, includes substantially the same features provided by the inlet housing section 14 of Fig. I, and is cup-shaped having a flared end merging into a mating flange 109, which is formed with symmetrically spaced openings for affixing it in different positions to the valve housing section 12' clamping therebetween the secondary diaphragm 90'. A cylindrical wall 111 which forms an integral part of the housing section 108, extends upwardly dividing its interior into two concentric chambers. The central chamber provides the outlet distendable air dome 116 closed by the secondary diaphragm 90' and the outer chamber forms an open annular compartment 117 constituting the sediment-collecting and the fuel-retaining chamber which receives through the inlet connector 118 formed on its outer wall the fuel drawn from a supply by the pump.

In the form shown in Fig. II, filtering means are provided which are preferably placed before the fuel passes the skirted openings on its way to pumping chamber 61'. This filtering means is shown in the form of an annular member 119 made of fine mesh wire cloth or filter screen located above the secondary diaphragm 90' and is secured in position by clamping its marginal surfaces between the ends of the walls 82' and 111 respectively.

It should be observed that in this form of the invention, the preferred type of common means for clamping the housing sections in desired positions are illustrated, also that the outlet air dome is an integral part of the inlet connector section 108, and, in addition, that the upper section of each of the compartments 83' provides ample air domes or pulsation damping chambers for the passage of fuel through the pumping mechanism. Moreover the drawing illustrates the relative position of the composite lever section 123 and 125 when the pumping chamber 61 is partially full with undelivered fuel, building pressure therein.

The operation of the modified form of the invention shown in Fig. II is similar in all respects to the operation hereinbefore described in connection with the embodiment shown in Fig. I and, therefore, it appears unnecessary to repeat the same.

Referring to Fig. V of the drawings, in which the main features of the invention are illustrated as embodied in a combined fuel and air pump or vacuum booster unit, it should be noted that the fuel pump proper is illustrated inverted from the position of the embodiment shown in Fig. I. In the embodiment shown in Fig. V, the fuel pump is formed by superimposing three separable transverse sections provided with mating flanges joined together clamping in spaced relation a main and a secondary annularly apertured diaphragm. In this form of the invention, the inlet connector housing section 14" and the valve and outlet connector housing section 12" are substantially identical with the corresponding housing sections shown and described with respect to Fig. I and, therefore, the same will not be described in detail, and the following description will be particularly directed to the torque transmitting mechanism, its supporting housing, and the air pump or vacuum booster.

The torque transmitting mechanism forming the elastic coupling between the power driven part 39", and the reciprocable pressure responsive pumping element 20", as shown in Fig. V, is inclusive of a lever pivoted on the stationary housing section 129. The lever 130 is of channel-shaped cross-section formed of sheet steel with a uniplanar top surface extended at each side of its pivotal axis 131 forming an outer arm 132 adapted to contact the continually operated cam 39" and an inner composite arm structure including the rigid section 133 and the yielding acting part 135. The rigid section 133 is shown as an integral part of the lever while the yielding part 135 is shown as a leaf spring having one end riveted at 136 to the inner surface of the lever arm section 132 at a point located rearwardly of its pivotal axis. In this form of the invention, in order to secure the proper bias relationship and produce mutual contacting engagement in an asymptotic line between the components of the bifurcated section of the lever, the leaf spring 135 is formed adjacent to the riveting point with a flat section 137 and the remainder is curved whereby not only an angular relationship is accomplished but rolling contacting engagement is provided between the leaf spring and the inner planar surface of the lever.

The outer extremity of the arm 132 has a pivoted shoe 139, preferably having a curved or arcuate face for engagement with the continually rotating cam 39" in order to provide a large bearing area to take the load and thereby decrease wear. The divergent members 133 and 135 forming the inner arm of the lever, are slotted, forming forked end sections 140 and 141 respectively which are arranged to straddle the shank of the pull rod 18". The leaf spring 135 is constructed and arranged, so that its forked section 141 is in constant engagement with the under side of the enlarged head 30" of the pull rod 18" snugly straddling its shank and has it extreme end abruptly bent as 142 nesting the head 30" and thereby providing not only a constant pull on the diaphragm but also continually guiding the pull rod 18" whenever movement is imparted thereto.

In the form shown in Fig. V, the forked section 140 projects beyond the leaf spring 135 and its end is provided with an upstanding flange 143 adapted to snugly embrace and retain a ferrule or spherically-based spool 145 permitting a rocking motion with respect to the lever section. The bore of the spool 145 is arranged for a sliding fit with the reduced end of the shouldered portion of the pull rod 146 providing a ball joint connection between the lever and the push rod. Shock absorbing and noise-dampening means are interposed between the planar end of the ferrule 145 and the shoulder of the push rod 146 which preferably take the form of a fiber and companion metallic washers 147 and 148, to thereby insure the quietness of the combined fuel and air pump.

The housing section 129 is formed at its top outer wall with a recessed or depressed section merging into an outwardly directed peripheral flange 149 adapted to receive suitable fastening means for securing in fixed relation the housing section 129 with the inlet and outlet connector section 150 of the air pump clamping the air pump diaphragm 152 therebetween. The diaphragm constitutes the movable wall of the pumping chambers 153 and 154 located on each side thereof, producing a double acting pump functioning as a substantially non-pulsating source of sub-atmospheric pressure for operating various automobile accessories, as well as acting as a vacuum booster pump when the same is operatively connected to the engine manifold vacuum.

The depressed section of the housing member 129 is pierced by an aperture 156 to permit the passage of the push rod 146 supporting a suitable air and oil seal designated generally by numeral 157 which prevents oil seepage and the ingress of foreign matter into the pumping chamber 153 without interference to the freedom of movement of the push rod 146. Adjacent to the aperture 156 there is provided an orifice 158 arranged to accommodate the outlet check valve sub-assembly for the lower pumping chamber 153. The vertically disposed wall of the depressed section of the housing 129 is formed with an orifice constituting the inlet port 159 controlled by the inlet check valve sub-assembly retained in an enlarged portion of port 159 formed adjacent to the peripheral flange of the housing section 129. The upper end of the push rod 146 is fixed in fluid-tight relation to the diaphragm 152 through oppositely disposed cupped discs or reinforcing 163 and 164, clamped between the shoulder formed by the reduced end section of the push rod and its swaged extreme end.

The top section 150 of the air pump is formed with a depressed portion 165 merging into an elongated tubular extension 166 adapted to enclose a resilient member or coil spring 167 located in axial alignment with the push rod 146. The spring 167 reacts against the closed end of the extension 166 and has its other end in engagement with the reinforcing plate 164 of the diaphragm 152. The housing 150 is also provided with an outlet port 168 and an inlet port 169 located on each side of the elongated tubular section 166 each having suitable cavities for receiving the inlet and outlet check valve sub-assemblies which operate to control the flow of fluid to and from the air pumping chamber 154. The section 150 is formed with a passageway 170 which interconnects the inlet valve cavities of both pumping chambers, forming thereby common passageway means for the ingress of air to the pumping chambers through their respective inlet check valves sub-assemblies.

It should be observed that the diaphragm 152 also acts as gasket means between the housing sections 129 and 150 and is provided with an aperture so that the passageway 170 is unobstructed between the inlet valves of each of the pumping chambers. The resilient member or spring 167 which conditionally produces intake stroke of the pumping chamber 154 and the discharge stroke of the pumping chamber 152 is arranged to encircle an elongated thimble 172, having its closed end adjacent to the pumping diaphgram 152. The thimble 172 performs the dual function of limiting the upper motion of the diaphragm 152 in case high vacuum is applied to the pumping chamber 154 when the pump is connected by way of its outlet connector 168 to an engine inlet manifold vacuum, as well as means to reduce the compression ratio of the upper pumping chamber 154.

It is contemplated that the check valves for the inlet and outlet ports of each of the pumping chambers 153 and 154 should be identical and produced by stampings made of sheet metal as a unitary assembly. As particularly shown in Figure X, the check valve disclosed is of the disk or wafer type, comprising an enclosing or supporting cage 176 formed with a circularly-shaped peripheral channel 178 having spaced inwardly projecting parallel sections for clamping in position an annular seat member 180. The cage 176 has a reduced vertical section 183 of rectangular contour connected to a smaller dome-like end section 184 providing a reacting abutment or a stop for the resilient member or a helical spring 185 which normally holds a valve disk 186 in closed position by its engagement with the valve seat member 180. The rectangularly shaped section 183 is arranged to guide the disc valve 186 and walls of the cage 176 are ported or provided with cutaway portions in its vertical and lateral sections whereby unobstructed passage is provided for the flow of fluid through the cage. The valve disk 186 is preferably made of rubber-like or flexible material having a thin cross section reduce its weight and thereby insure rapid actuation as a flow checking means.

The arrangement and the constructional features of the check valve components accommodate very readily to low cost mass production and the rapid manufacture and assembly of a unitary check valve of light weight but of rugged construction. The check valve thus produced is adapted for quick insertion by press-fitting, without disturbing the relationship of the components or the original calibration. In the form shown, the peripheral channel 178 of the valve cage 176 is dimensioned, with respect to the inlet and outlet cavities of the housing sections 129 and 150 to be secured thereto by being press-fitted therein. This arrangement not only expedites the overall assembly of the pump but the repair or replacement of the check valves can be carried out in a negligible period of time by non-skilled persons.

In operation it should be noted that whenever the air pump is used or functions as a single source of vacuum for operating automobile accessories, by having its inlet connector nipple 190 connected thereto, the reciprocation of the diaphragm 152 produces a concurrent change in the volume of each of the pumping chambers 153 and 154. The concurrent change in volume of both pumping chambers causes the application of a non-pulsating vacuum to the accessories connected to the inlet connector nipple 190 due to its communication with the inlet valves of both pumping chambers 153 and 154 by way of the passageway 170.

In case the air pump is connected by way of its outlet connector nipple 192 to the engine intake manifold to be used as a booster, the vacuum produced by the reciprocation diaphragm 152 will assist whenever the engine manifold vacuum is below the vacuum output of the air pump. The vacuum assistance provided by the air pump will be dependent upon the value of the engine manifold vacuum as the stroke of the diaphragm 152 is controlled thereby, because the action of engine vacuum in the pump chamber 154 will prevent the spring 167 to flex the diaphragm outwardly with the lever 130 so that there will be a relative motion between the pull rod and the ball joint connection 145 provided at the forked end 140 of the lever 130.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A fuel pump comprising a main flexible diaphragm, a secondary flexible diaphragm, a composite housing made up of three superimposed housing members having flanges arranged to be joined together in different angular relationships clamping in spaced relation said main and secondary flexible diaphragms by their marginal surfaces, the said secondary diaphragm having spaced arcuate perforations surrounded by an outwardly disposed imperforated section connecting its marginal surface to an imperforated central section, the first of said housing members forming with one face of the main diaphragm a closed pumping chamber carrying annular inlet valve means and a centrally located outlet valve, said first housing member having its outer wall pierced by an aperture forming an outlet connector for the delivery of fluid discharged from the pumping chamber, cup-like means centrally carried by the second housing member forming a central and annular open-ended chambers to provide with the centrally and outwardly disposed imperforated sections of said secondary diaphragm a centrally located closed pulsator outlet chamber and annular distendable inlet fuel pulsations damping means, said second housing member having its outer wall formed with an inlet connector for the ingress of fuel transversing the spaced perforations to said pulsation damping means, and the third housing member located on the reverse face of the main diaphragm forming a chamber for housing the mechanism for actuating the main diaphragm.

2. In a fuel pump, a main flexible diaphragm, a secondary flexible diaphragm, separable housing sections held in superimposed relation clamping in spaced relation said main and secondary flexible diaphragms which act as sealing gaskets therefor forming the pump housing, one of said separable housing sections having a transverse wall forming with said main diaphragm a pumping chamber, said transverse wall having a central opening surrounded by spaced apertured disposed outwardly therefrom to provide central outlet and annular inlet valve means for the pumping chamber, the said secondary diaphragm having spaced apertures providing fuel passages to said annular inlet valve, means surrounded by an outwardly disposed imperforated section connected to a central imperforated section a depending circular wall carried by said separable housing section surrounding said outlet valve on its discharge side to provide with the central and outwardly disposed imperforated sections of said secondary diaphragm a distendable cell centrally disposed for receiving fuel from the outlet valve and an annularly distendable damping chamber for the inlet valve, and a fuel passage carried by said separable housing section in communication with the circular wall of said distendable cell transversing said damping chamber for the discharge of fuel from said cell.

3. In a diaphragm pump, a plurality of detachable hollow sections each provided with mating flanges arranged to be joined in different annular relationships to form a composite housing, a pumping diaphragm, a secondary diaphragm having a centrally imperforated section surrounded by spaced openings intermediately located providing an outwardly disposed imperforated section, said pumping and secondary diaphragms interposed between said hollow sections, a wall transversing one of said hollow sections substantially at its median portion to form at one side thereof with the pumping diaphragm the pumping chamber, said wall formed with a central aperture surrounded by spaced openings, one-way valves controlling respectively said central aperture and said spaced openings to provide annular inlet and centrally disposed outlet valves, a circular wall projecting vertically from the other side of said transversing wall, said circular wall located between the openings and the central aperture of said transversing wall, and a cup-like member centrally carried by another hollow section having its open end in registration with the end of said circular wall for clamping therebetween the secondary diaphragm whereby the central and outwardly disposed imperforated sections of said secondary diaphragm form the distendable portion of a closed pulsator chamber in axial alignment with the outlet valve and the distendable portion of an annular damping chamber for the inlet valve.

4. A diaphragm pump comprising three detachable substantially hollow sections arranged to be joined in different angular relationships to form the pump housing, the first hollow section providing the support of the diaphragm actuating mechanism, inlet and outlet port openings pierce respectively the outer walls of the second and third hollow sections, a pumping diaphragm clamped between the first and second hollow sections, a wall transversing the second hollow section to form on one side thereof with the pumping diaphragm the pumping chamber, said wall being apertured to provide annular inlet and centrally disposed outlet valves for the pumping chamber, a circular wall vertically disposed projecting from the other side of said transversing wall between the inlet and outlet valves, a cup-like member carried by the third hollow section, said cup-like member arranged to have the terminal portion of its open end in registration with the end of said circular wall, and a secondary diaphragm having an imperforated central section with spaced perforations intermediately disposed to provide guiding passages from said inlet port opening to said inlet valve surrounded by an outwardly disposed imperforated section, said secondary diaphragm interposed between the second and third hollow sections whereby its imperforated central section forms with the said circular wall the distendable member of a centrally disposed fuel-receiving cell and with the outwardly disposed imperforated section of the secondary diaphragm the distendable member of an annular inlet pulsations damping chamber, and the said imperforated central section of the secondary diaphragm forms with the cup-like member the distendable wall of a centrally disposed closed outlet pulsator chamber.

5. In a diaphragm fuel pump, three detachable substantially hollow sections arranged to be superimposed in different angular relationships to form a composite housing, the first section providing the support of the diaphragm actuating mechanism, outlet and inlet port openings formed respectively in the outer walls of the said second and third hollow sections, a pumping diaphragm clamped between the said first and second hollow sections, a transverse wall dividing the said second hollow section forming on one side thereof with the pumping diaphragm the fuel pumping chamber, said wall being apertured at its central and outward portions to provide annular inlet and centrally disposed outlet valves for the pumping chamber, a circular wall vertically disposed projecting from the other side of said transverse wall surrounding the outlet valve on its discharge side, a secondary diaphragm having an imperforated central zone with its outward section formed with spaced perforations surrounded by imperforate portions to provide fuel passages from said inlet port opening to said inlet valve, said secondary diaphragm clamped between the said second and third hollow sections providing by its imperforated central zone with said circular wall a distendable fuel-receiving chamber directly connected with said outlet valve, the imperforate portions of the outward section of the secondary diaphragm interposing damping means for checking the direct force of the entering fuel on the inlet valve, and a fuel passageway piercing said circular wall for directly connecting said fuel-receiving chamber with said outlet port opening.

References Cited in the file of this patent

UNITED STATES PATENTS

| | | |
|---|---|---|
| 1,633,772 | Clapp | June 28, 1927 |
| 1,738,786 | McKinley | Dec. 10, 1929 |
| 2,063,047 | Noble | Dec. 8, 1936 |
| 2,189,526 | Babitch | Feb. 6, 1940 |
| 2,266,297 | Babitch et al. | Dec. 16, 1941 |
| 2,537,241 | Smith | Jan. 9, 1951 |
| 2,619,907 | Paterson | Dec. 2, 1952 |
| 2,625,114 | Coffey | Jan. 13, 1953 |
| 2,801,594 | Lewis | Aug. 6, 1957 |
| 2,832,295 | Waldherr | Apr. 29, 1958 |

FOREIGN PATENTS

| | | |
|---|---|---|
| 744,873 | Great Britain | Feb. 15, 1956 |
| 773,026 | France | Nov. 10, 1934 |